United States Patent Office 3,227,762
Patented Jan. 4, 1966

3,227,762
PRODUCTION OF N-TRISUBSTITUTED BORAZANES
Michael Peter Brown, East Molesey, and Derek Graham Older, Weybridge, Surrey, England, assignors to United States Borax and Chemical Corporation, Los Angeles, Calif.
No Drawing. Filed Jan. 25, 1963, Ser. No. 254,002
Claims priority, application Great Britain, Feb. 8, 1962, 4,961
5 Claims. (Cl. 260—583)

This invention relates to the production of N-trisubstituted borazanes.

The N-trisubstituted borazanes are addition compounds of the general formula tert.-amine·$BH_3$, also known as tertiary amine boranes, and have have found to have very valuable properties. They are covalent materials which are soluble in organic solvents and in addition are stable to hydrolysis and atmospheric oxidation, a property not usually possessed by non-ionic compounds containing the —$BH_3$ group. As such they are valuable reducing agents, often proving superior to borohydrides owing to their stability and solubility in organic solvents. They may also be used instead of boron hydride in boronising steel, by treating the hot metal with the vapour of the substituted borazane. In addition they serve as valuable intermediates in the synthesis of other boron compounds. For example, they undergo a reaction with olefins to give organo-boron compounds; for instance they react with ethylene to yield triethyl boron. Also the borazanes provide a convenient and safe form for storing diborane, which may be obtained from them quantitatively by means of the reaction with a boron halide.

Hitherto the N-trisubstituted borazanes have been comparatively inaccessible and expensive materials, a fact which has restricted their development as industrial chemicals. While a number of methods of making them have been described, all these suffer from one or more disadvantages that make them impracticable for commercial use. Thus some of them depend for success on the use as a starting material of lithium borohydride, which is a very expensive compound; some require the use of strictly dry and oxygen-free conditions, or of very high pressures; some use dangerous or inconvenient starting materials such as the spontaneously inflammable trialkyl boranes or diborane, or inconvenient solvents such as liquid ammonia, or large amounts of solvent involving expensive recovery procedures.

It is an object of the present invention to provide a method for making N-trisubstituted borazanes which is free of the above disadvantages.

According to the invention N-susbtituted borazanes are made by effecting reaction, preferably at or below room temperature (say 25° C. or below), between an alkali metal borohydride and a tertiary amine salt while they are maintained in suspension in a tertiary amine, which is a liquid at the temperature employed and which contains also water. The procedure is superior to all other processes in that the borohydrides used can be those of sodium and potassium which are the least expensive; the reactants can be used in concentrated suspension, thus doing away with the necessity for the use of large volumes of solvent and the resulting need for large and costly equipment; the reaction can be carried out at room temperature or below; and there is no need to use dry reactants or to work in the absence of oxygen. High purity reactants are not necessary as it is possible to achieve equally successful results with commercial grade materials, and the product is readily isolated from the reaction mixture.

Normally the reaction will be carried out by first forming a suspension, especially a concentrated suspension, of the alkali metal borohydride and tertiary amine salt in the tertiary amine, and then adding a little water, preferably about 0.75–1.5 mole for each mole of the borohydride as more fully described below. It has been found that when a concentrated suspension of an alkali metal borohydride and a tertiary amine salt in a tertiary amine is formed, hydrogen is evolved, and the N-trisubstituted borazane is formed, only very slowly if at all. However the addition of a small quantity of water to the reaction mixture accelerates the reaction, and the borazane is formed many times more rapidly than when no water is present. It has further been found that if the reactants are especially dried the formation of the borazane is almost entirely inhibited.

The tertiary amine salts employed are preferably those of strong acids such as hydrochloric, hydrobromic, or sulphuric acid. They have the formula $R_3N·HX$ or $(R_3N)_2H_2X$, in which all the R radicals may be the same or different and represent alkyl groups containing 1–20 carbon atoms, aryl groups, or cycloalkyl groups which may be substituted or unsubstituted and in which the ring contains from 5–7 carbon atoms, or they may be salts of heterocyclic tertiary amines in which the tertiary amino group is in the ring such as pyridine or a substitution derivative thereof, e.g. a methyl or other low alkyl pyridine, or an N-alkyl-morpholine or piperidine, etc.

The tertiary amine used as a dipersing medium may be of the type $R_3N$ where R is as defined above, or it may be a heterocyclic amine, as described above. It is preferable that this amine is a liquid at room temperature, to avoid having to heat the mixtures.

The tertiary amine salt and the alkali metal borohydride are preferably suspended in substantially equimolar proportions in sufficient tertiary amine to give a mobile and workable suspension on stirring. As already mentioned, no special precautions have to be taken with regard to the purity or dryness of the reagents, and the apparatus employed may be of any suitable type, there being no necessity to exclude oxygen or moisture. When a suitable suspension has been obtained, a small quantity of water is added. The total amount of water used does not appear to be critical, but is preferably approximately one mole, e.g. between 0.75 and 1.50 moles, per mole of alkali metal borohydride. More water may be used but this tends to complicate the working up of the products. When the water has been added stirring is continued and hydrogen is evolved. Preferably the water is added over a period of time such that a steady and easily controlled evolution of hydrogen takes place. When the hydrogen evolution is finished, i.e. the water no longer causes gas to be evolved, the reaction mixture is filtered and the product is separated from the reaction medium by conventional means such as distillation or crystallisation. It is not necesary to heat the reactants, although this may be done if desired, e.g. when the dispersing medium is a low melting solid which is not a liquid at room temperature, or if the product is a solid which is thrown out of the solution after it has reached a certain concentration, so rendering stirring more difficult.

The reaction is thought to proceed by a two stage mechanism thus:

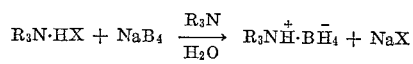

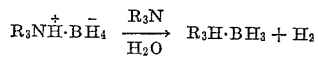

in which Na can be replaced by K, but the invention is not restricted to any particular reaction mechanism.

An advantage of the invention is that N-trisubstituted borazanes may be produced which contain $NR_3$ groups different from that contained in the tertiary amine solvent. It is known (J.A.C.S., 1942, 64, 325 and Chem. Revs., 1942, 31, 1) that N-trisubstituted borazanes may be transaminated as follows $$RH_3N \cdot BH_3 + R_3'N \to R_3'N \cdot BH_3 + R_3N$$

where R is as defined above and R' is another of the same class but in which the tertiary amine $R_3N$ is more volatile than the tertiary amine $R_3'N$. Thus if the amine from which it is desired to prepare the corresponding borazane is scarce or is a solid, so that it is not convenient to use it as the dispersing medium, it is only necessary to employ sufficient in the form of its salt to form the borazane, the dispersing medium being a readily available or more volatile tertiary amine, for example triethylamine.

In a similar manner if desired, it is possible to use a low molecular weight tertiary amine salt and a higher molecular weight solvent. In this case after the hydrogen evolution has ceased and the reaction mixture has been filtered the filtrate should be heated to remove the solvent and the more volatile tertiary amine derived from the salt by distillation. On heating transamination takes place and the more volatile tertiary amine orginally in the form of the salt is removed by distillation. Subsequently the excess of the less volatile amine is removed, leaving the product, an N-substituted borazane of the type $R_3'N \cdot BH_3$.

Alternatively the dispersing medium may consist of a mixture containing at least one mole of a less volatile tertiary amine ($R_3'N$) dissolved in a more readily available and more volatile tertiary amine ($R_3N$). In this mixed dispersing medium is suspended a tertiary amine salt of the same more volatile tertiary amine $R_3N$ or another such amine that is more volatile than $R_3'N$.

In this manner it is possible to prepare N-trisubstituted borazanes from readily accessible tertiary amine salts and the specific tertiary amine required using only so much of the free tertiary amine which is to constitute the amine component of the product as is stoichiometrically necessary. For example N-dimethylstearylborazane may be conveniently prepared from one mole of sodium borohydride and one mole of triethylamine hydrochloride suspended in sufficient triethylamine containing one mole of dimethylstearylamine to give a mobile dispersion, by the addition of water to the dispersion followed by the filtration of the reaction product and distillation of the filtrate.

The invention is illustrated by the following examples; all volumes of hydrogen are as reduced to N.T.P. (0° C. and 760 mm.) pressure.

Example I

Sodium borohydride (40 g. 1.06 mole) and trimethylamine hydrochloride (100 g. 1.04 mole) were suspended in 200 ml. of trimethylamine cooled to −10° C. contained in a flask fitted with a condenser cooled to −78° C. and a stirrer. No gas evolution occurred. 25 ml. of water was then added over a period of 3 hours with stirring. The addition of water caused hydrogen to be evolved. After 3 hours 22.1 litres of hydrogen had been evolved. When the reaction was complete the mixture was warmed to room temperature and the trimethylamine distilled off. To the residue was added petroleum ether (100 ml.) and water (100 ml.), and after mixing the liquid was allowed to stand and then separated. Evaporation of the solvent from the petroleum ether fraction yielded 68 g. (90.0% based on the trimethylamine hydrochloride) of N-trimethylborazane M.P. 91.5°–93° C.

Example II

Sodium borohydride (37.8 g. 1.0 mole) and triethylamine hydrochloride (95 g. 0.69 mole) were suspended in 200 ml. of triethylamine and the mixture stirred. Hydrogen was rapidly evolved on the addition of water (25 ml.), the rate of water addition being adjusted to maintain a steady evolution of gas which virtually complete (18 litres) after four hours. The resulting mixture was filtered and the filtrate distilled to yield 64.4 g. (81% based on the triethylamine hydrochloride) of N-triethylborazane B.P. 92–93° C./10 mm.

The importance of the addition of water was demonstrated when the same reaction (using identical quantities and the same undried reactants) was carried out. In this case the reaction was much slower, only 1.7 litres of hydrogen being evolved after 4 hours. When the same reaction was repeated using carefully dried reagents and without adding water, no hydrogen evolution was discernible after 3 hours.

Example III

Sodium borohydride (37.8 g. 1.00 mole) and triethylamine hydrochloride (137.8 g. 1.00 mole) were suspended in triethylamine (200 ml.) contained in a flask fitted with a stirrer and cooled by means of an ice bath. Hydrogen was evolved only slowly (2.0 litres in 3 hours). On adding water (15 g.) over a period of 3½ hours more hydrogen was given off rapidly (24.0 litres). After this time no more hydrogen was evolved and the addition of further water had no effect. The reaction mixture was filtered and the residue washed with triethylamine. The combined filtrate and washings were distilled and yielded triethylamine and N-triethylborazane (77.8 g. 68%) B.P. 92–93° C./10 mm.

Example IV

A mixture of dry triethylamine hydrochloride (13.70 g., 0.100 mole), sodium borohydride (3.75 g., 0.100 mole) and dimethylstearylamine (21.0 g., 0.071 mole), together with 50 ml. of triethylamine as solvent was placed in a 250 ml. three-necked flask, which was fitted with a stirrer, water-jacketed condenser and dropping funnel. Water (2.50 g., 0.139 mole) was then added dropwise to the vigorously stirred reaction mixture. Hydrogen gas was evolved over a period of 1.5 hours and the mixture was then stirred for a further 1.5 hours. The white precipitate of sodium chloride was filtered off and washed with more dry triethylamine, and the washings were combined with the filtrate. The triethylamine was then distilled off at atmospheric pressure (bath temperature 120°–130° C.). When no more amine distilled over, the receiver was replaced by one at −78° C. A slow stream of dry nitrogen was passed through the contents of the flask and the bath temperature was raised to 155°–160° C. for 4.5 hours. A further quantity of triethylamine (8.50 g., 0.084 mole) was obtained.

The crude reaction product was allowed to cool to room temperature, and was then broken up and extracted with light petroleum (B.P. 60°–80° C.). The small amount of insoluble residue was filtered off and discarded. The filtrate was evaporated down to yield a white waxy product which was heated to 70° C. under vacuum ($10^{-3}$ mm. Hg) for 2 hours to remove a small trace of triethylamine borane. The product, dimethylstearylamine borane (20.30 g., 0.065 mole, 92% yield), thus obtained had a melting point of 51.5°–53.0° C.

*Analysis.*—Found: B,3.84. Calc. for $C_{20}H_{46}BN$: B, 3.48%.

We claim:
1. In the method for preparing a tertiary amine borane by reaction of an alkali metal borohydride with a mineral acid salt of a tertiary amine in a suspension of a tertiary amine which is liquid at the reaction temperature, the improvement which consists of accelerating said reaction by adding to said suspension from about 0.75 to 1.5 mole of water for each mole of said alkali metal borohydride.

2. The method according to claim 1 in which said reaction takes place at a reduced temperature of less than about 25° C.

3. The method according to claim 1 in which said water is added over a period of time sufficient to control the evolution of hydrogen.

4. The method according to claim 1 in which the molecular weight of the tertiary amine in which the reactants are suspended in higher than that of the tertiary amine whose mineral acid salt is employed as a reactant, and when the reaction is substantially completed, the reaction mass is filtered and the filtrate heated at an elevated temperature sufficient to remove the more volatile tertiary amine by distillation.

5. In the method for preparing a trialkylamine borane by reaction of sodium borohydride with a mineral acid salt of trialkylamine in a suspension of a trialkylamine which is liquid at the reaction temperature, the improvement which consists of accelerating said reaction by adding to said suspension about one mole of water for each mole of said sodium borohydride.

References Cited by the Examiner
UNITED STATES PATENTS

| 2,765,312 | 10/1956 | Gould | 260—293 |
| 2,994,698 | 8/1961 | Schubert et al. | 260—290 |

FOREIGN PATENTS 608,476  11/1960  Canada.

NICHOLAS S. RIZZO, *Primary Examiner.*

JOHN D. RANDOLPH, *Examiner.*